(12) United States Patent
Barghouthi et al.

(10) Patent No.: US 7,225,205 B2
(45) Date of Patent: May 29, 2007

(54) APPARATUS AND METHOD FOR ENABLING DATABASE BATCH UPDATES WITHOUT MODIFYING GENERATED CODE

(75) Inventors: Soloman J. Barghouthi, Rochester, MN (US); Teresa Chung Kan, Rochester, MN (US); Yang Lei, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 10/777,735

(22) Filed: Feb. 12, 2004

(65) Prior Publication Data

US 2005/0183057 A1    Aug. 18, 2005

(51) Int. Cl.
*G06F 17/30* (2006.01)

(52) U.S. Cl. .................................... 707/200

(58) Field of Classification Search .................... 707/1, 707/2, 9, 10, 200; 709/224; 715/514
See application file for complete search history.

(56) References Cited

U.S. PATENT DOCUMENTS

2003/0226111 A1* 12/2003 Wirts et al. ................. 715/514

\* cited by examiner

*Primary Examiner*—Etienne P LeRoux
(74) *Attorney, Agent, or Firm*—Martin & Associates; Derek P. Martin

(57) ABSTRACT

An apparatus and method enable batch processing of database updates without modifying generated code, i.e., without redeployment of the application server or application. A batch mechanism intercepts calls from the generated code, compiles updates into batches, and processes the updates to the database in batches. In this manner the batch mechanism takes advantage of the batch processing capabilities of the database without modifying the generated code.

21 Claims, 7 Drawing Sheets

APPARATUS AND METHOD FOR ENABLING DATABASE BATCH UPDATES WITHOUT MODIFYING GENERATED CODE

BACKGROUND OF THE INVENTION

1. Technical Field

This invention generally relates to data processing, and more specifically relates to storage of data in a database.

2. Background Art

Since the dawn of the computer age, computers have evolved and become more and more powerful. In our present day, computers have become indispensable in many fields of human endeavor including engineering design, machine and process control, information storage and retrieval, and office computing. One of the primary uses of computers is for information storage and retrieval.

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Most modern databases support batch processing. Batch processing is a way to compile several database updates into a batch. The batch is then submitted to the database, which processes all updates in the batch. Many Java 2 Platform, Enterprise Edition (J2EE) application servers do not support batch processing. As a result, the batch processing support built into the database often goes unused by the application servers.

A J2EE application server provides a deploy tool that generates code that allows J2EE Container Managed Persistence (CMP) applications to interact with the database. This generated code must be backwards compatible for the same release of the J2EE application server. It would be relatively straightforward to incorporate batch processing into an application server by modifying the generated code to include batch processing support. This step, however, would require redeployment of the generated code, which in turn would required that all applications that access the database to be redeployed. This is an unacceptable requirement for inter-release revisions. When a new release is made, the batch processing support could be incorporated into the generated code, because the new release may requires the applications to be redeployed if they want to take advantage of any of the new features in the release. However, there is currently no known way to enable batch processing without affecting the generated code. Without a way to enable batch processing without affecting generated code, the J2EE application server industry will not be able to take advantage of batch processing until a new release of the J2EE application server software is released.

DISCLOSURE OF INVENTION

An apparatus and method enable batch processing of database updates without modifying generated code, i.e., without redeployment of the application server or application. A batch mechanism intercepts calls from the generated code, compiles updates into batches, and processes the updates to the database in batches. In this manner the batch mechanism takes advantage of the batch processing capabilities of the database without modifying the generated code.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments enable batch database processing even though generated code that interacts with the database does not support batch processing. Calls from the generated code are intercepted, and updates from the generated code are batched together by a batch mechanism, which then executes the updates to the database in a batch. In this manner, the performance of current applications that rely on generated code may be enhanced by providing batch processing in a manner that is transparent to the applications and generated code.

Figure 1:
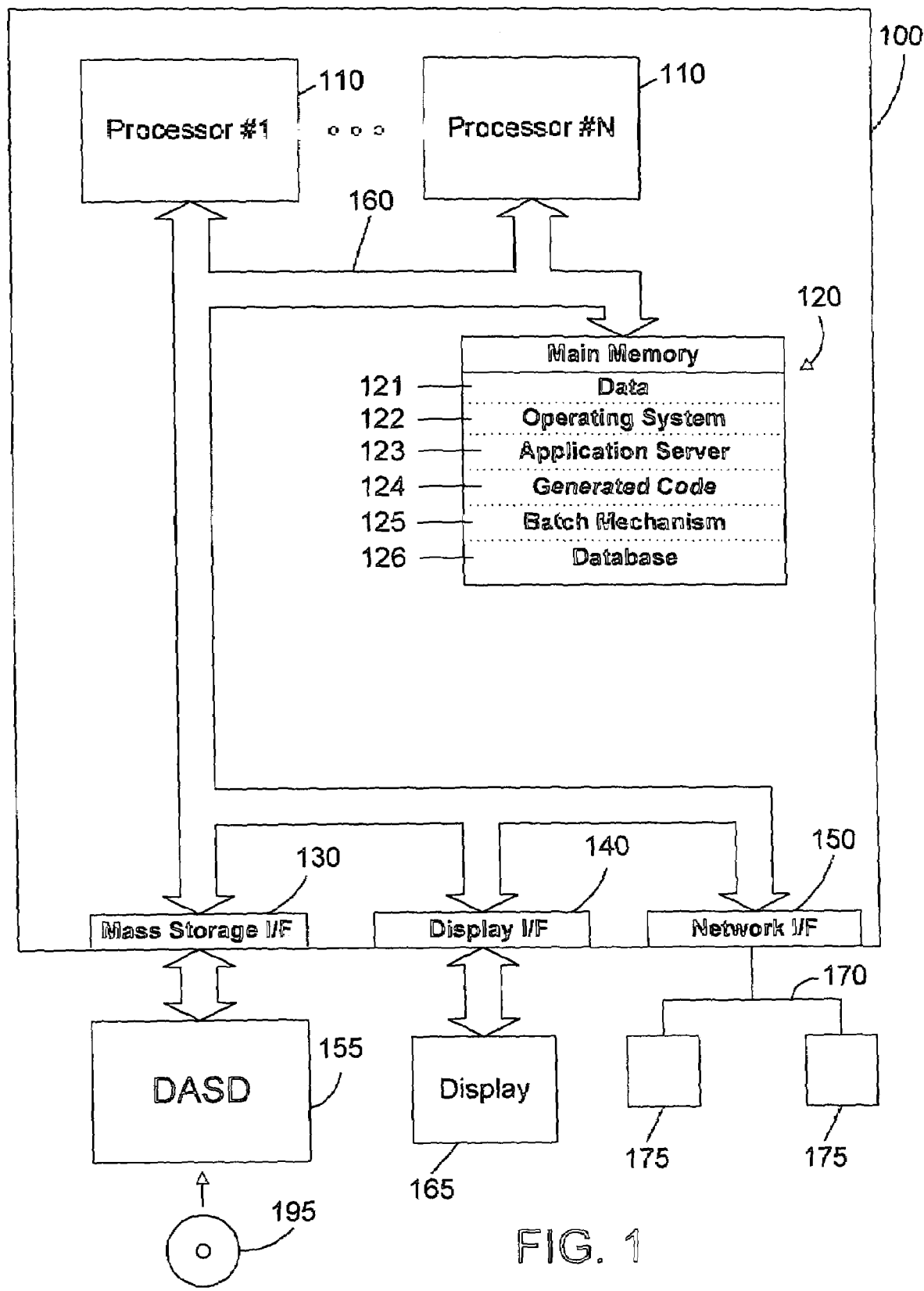
FIG. 1 is a block diagram of a computer apparatus in accordance with the preferred embodiments.

Referring to FIG. 1, a computer system 100 is an enhanced IBM eServer iSeries computer system, and represents one suitable type of computer system in accordance with the preferred embodiments. Those skilled in the art will appreciate that the mechanisms and apparatus of the present invention apply equally to any computer system. As shown in FIG. 1, computer system 100 comprises one or more processors 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195.

Main memory 120 contains data 121, an operating system 122, an application server 123, generated code 124, a batch mechanism 125, and a database 126. Data 121 is any data that may be read or written by any processor 110 or any other device that may access the main memory 120. Operating system 122 is a multitasking operating system, such as OS/400, AIX, or Linux; however, those skilled in the art will appreciate that the spirit and scope of the present invention is not limited to any one operating system. Any suitable operating system may be used. Operating system 122 is a sophisticated program that contains low-level code to manage the resources of computer system 100. Some of these resources are processor 110, main memory 120, mass storage interface 130, display interface 140, network interface 150, and system bus 160.

Application server 123 provides an interface for applications to access the database 126. One suitable example of application server 123 is a J2EE application server that has been modified to include part of the batch mechanism 125. The application server 123 generates the generated code 124, which contains the logic that defines how applications may interact with the database 126. One suitable example of generated code is a Java Container Managed Persistence (CMP) bean in the J2EE programming model. During a step called deployment, the generated code 124 is generated in a CMP bean. The generated code 124 contains SQL statements for interaction with the database 126.

Batch mechanism 125 provides a way for enabling batch processing in database 126 even though the generated code 124 does not support batch processing. Note that database 126 must support batch processing. For example, the database 126 could support batch processing defined by the JDBC specification by processing addBatch() and executeBatch() method calls. For this specific example, batch mechanism 125 receives calls from the generated code to perform updates, and batches together those calls using the addBatch() command. Once the last update in the batch is received from the generated code, the batch mechanism 125 calls the executeBatch() command. In this manner the batch mechanism 125 provides for batch processing in database 126 even though the generated code 124 does not support batch processing.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, application server 123, generated code 124, batch mechanism 125, and database 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the operating system 122.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
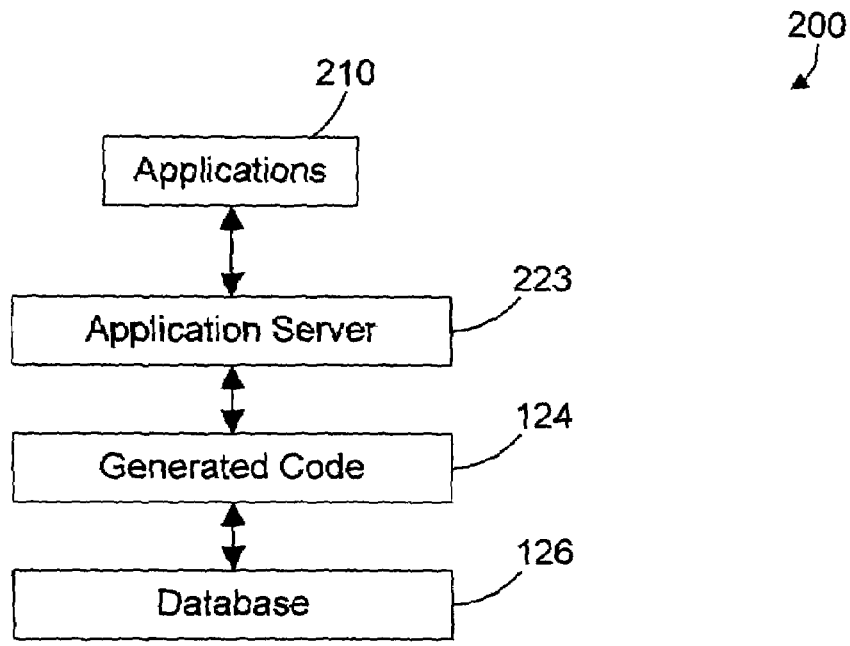
FIG. 2 is a block diagram of a prior art database system.

Referring to FIG. 2, a prior art database system 200 is shown. Software applications 210 may access the database 126 by interacting with an application server 223. Application server 223 is a standard J2EE application server known in the art. Application server 223 generates the generated code 124, typically at deploy time. We assume for this specific example that the generated code 124 does not support batch processing, although the database 126 does support batch processing. The application server 223 provides the interface that software 210 may call to access database 126. The generated code 124 provides the code that application server 223 accesses to interact with the database 126.

Figure 3:
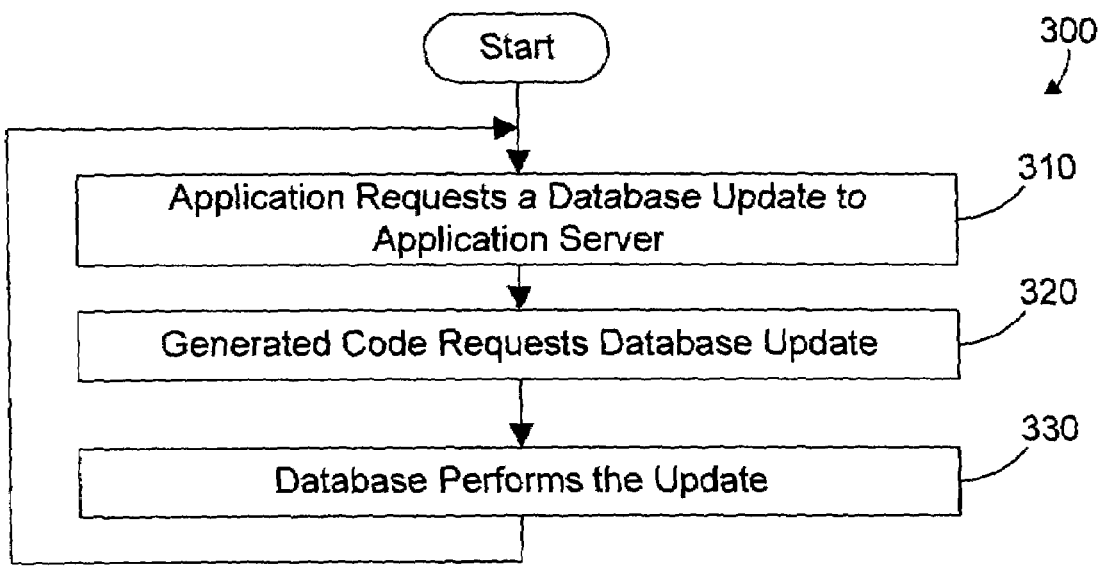
FIG. 3 is a flow diagram of a prior art method for processing database updates in the prior art system shown in FIG. 2.

A prior art method 300 for accessing the database in the system of FIG. 2 is shown in FIG. 3. An application requests a database update to the application server (step 310). In response, the generated code requests the database update (step 320). The database then performs the update when requested by the generated code (step 330). Note that steps 310, 320 and 330 are repeated for each and every database request received by the application server. We see from this simple example that the generated code does not support batch processing, it simply processes update requests from the application server one at a time.

Figure 4:
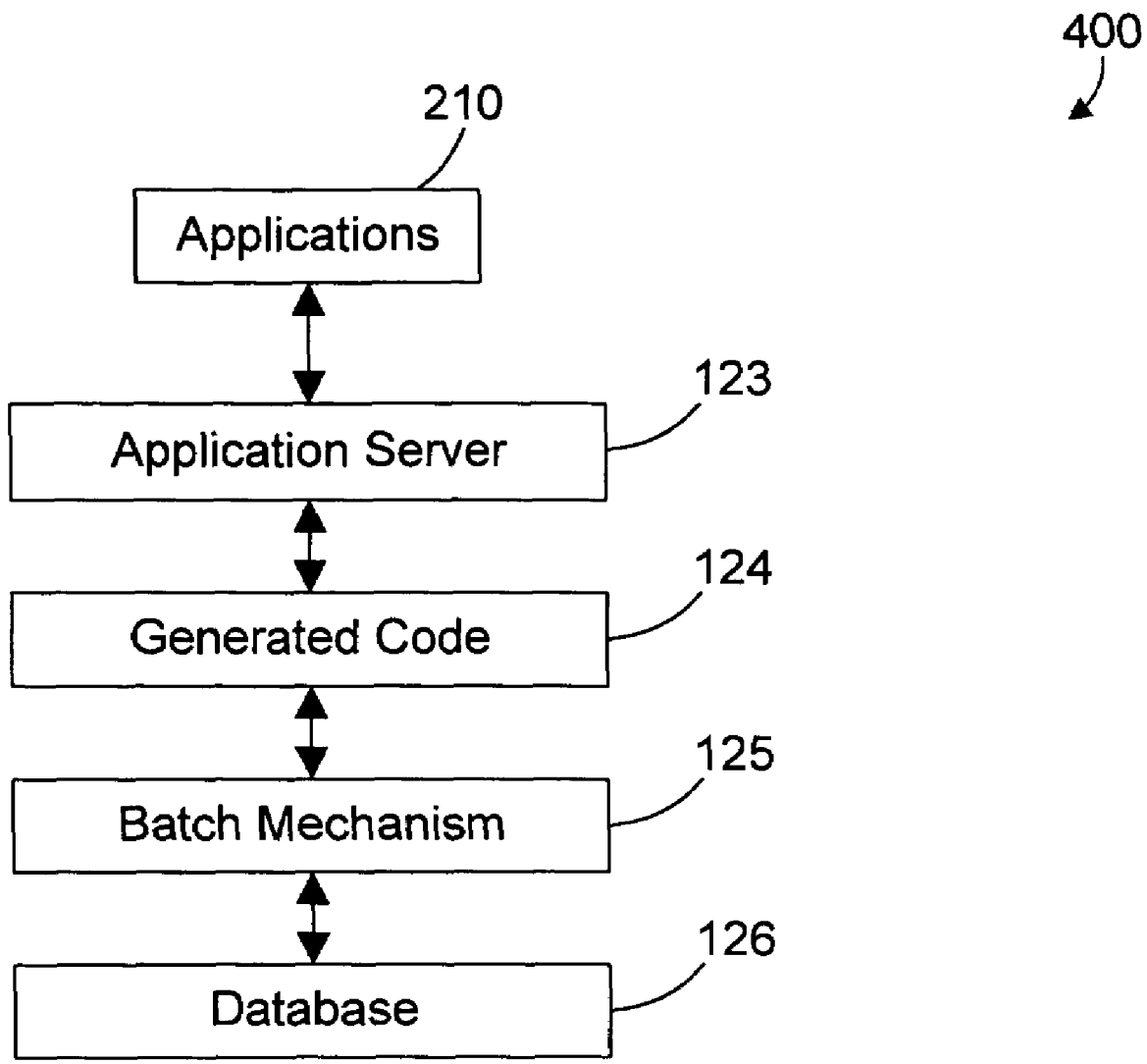
FIG. 4 is a block diagram of a database system in accordance with the preferred embodiments.

Referring now to FIG. 4, a database system 400 in accordance with the preferred embodiments includes many of the same features shown in prior art database system 300 in FIG. 3. The difference is the addition of the batch mechanism 125, which intercepts calls by the generated code, and sends groups of requests from the same bean type as a batch to the database 126. In the prior art system 200 shown in FIG. 2, the generated code 124 communicates directly with the database 126. Because the generated code 124 does not support batch operations, the batching capability of the database 126 goes unused. In the preferred embodiments, however, the batch mechanism intercepts the calls from the generated code, batches updates from the same bean type, and executes the batched updates. This is done without any changes to the generated code 124 and without redeployment of the application. The result is a system 400 that improves performance by using the batch processing capability of the database 126 in a manner that is transparent to the generated code 124.

Figure 5:
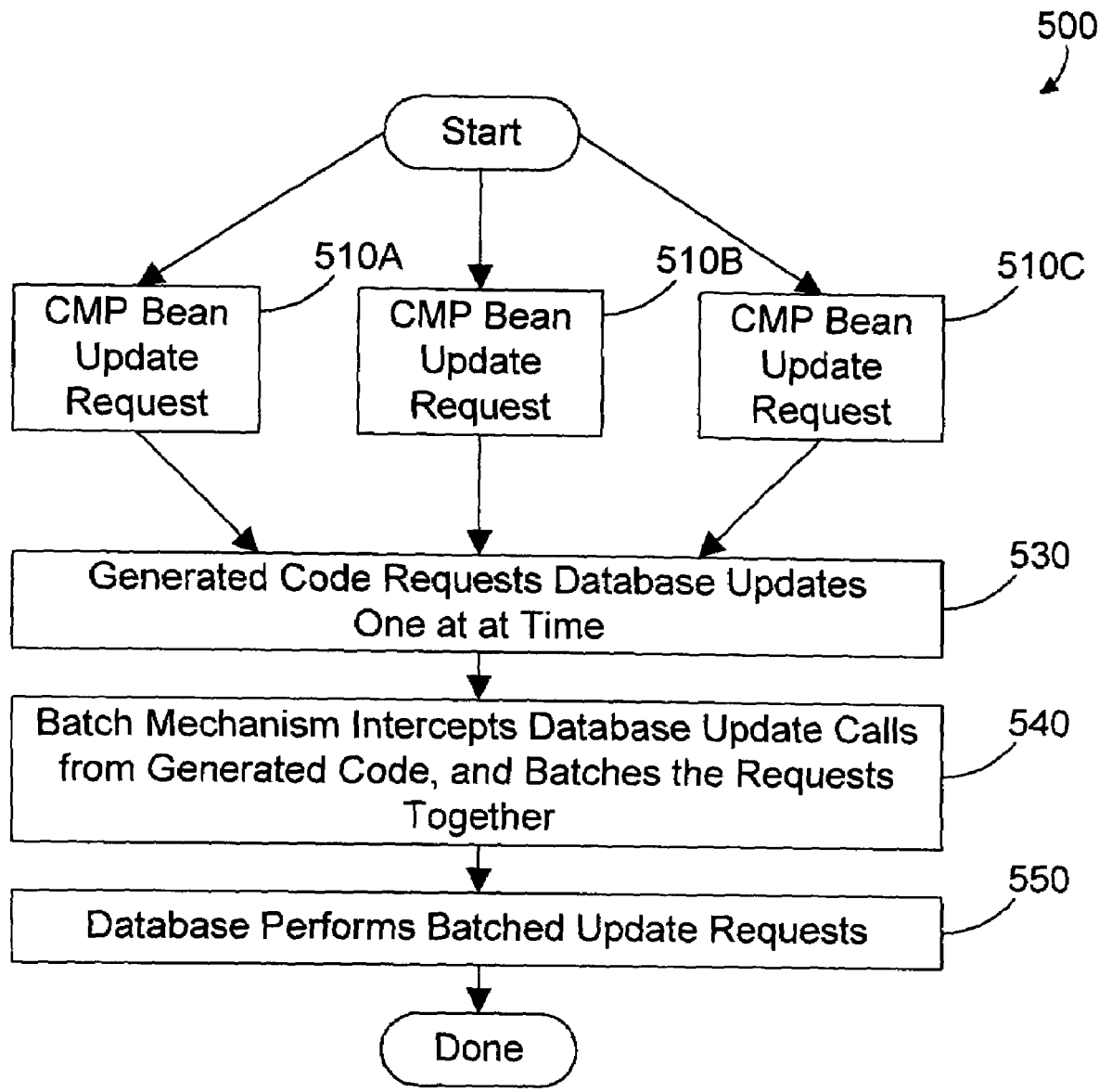
FIG. 5 is a flow diagram of a method in accordance with the preferred embodiments for enabling batch processing of database updates in the system shown in FIG. 4.

A method 500 in accordance with the preferred embodiments is shown in FIG. 5. Method 500 shows three different CMP bean update requests 510A, 510B and 510C being made. Note that these CMP bean update requests 510A, 510B and 510C are made by a single application in the same transaction. The generated code then requests the database updates one at a time (step 530). Note, however, that the one-at-a-time update requests by the generated code are intercepted by the batch mechanism, which batches the requests together (step 540). The database then performs the batched update requests (step 550). Method 500 clearly shows the benefits of the present invention. No changes are required to the generated code. The generated code still processes update requests one at a time. The batch mechanism intercepts the calls from the generated code, and batches these requests together to take advantage of the batch processing capability in the database. In this manner the performance of the database system 500 is greater than for system 300 in FIG. 3, because the database performs batch processing of requests (see step 550 in FIG. 5). Yet this improved performance is achieved in a way that does not affect the generated code. As a result, the batch processing of the preferred embodiments may be implemented in a "fix pack" release (a release that occurs between revisions) of the J2EE application server, and without redeployment of the application.

Figure 6:
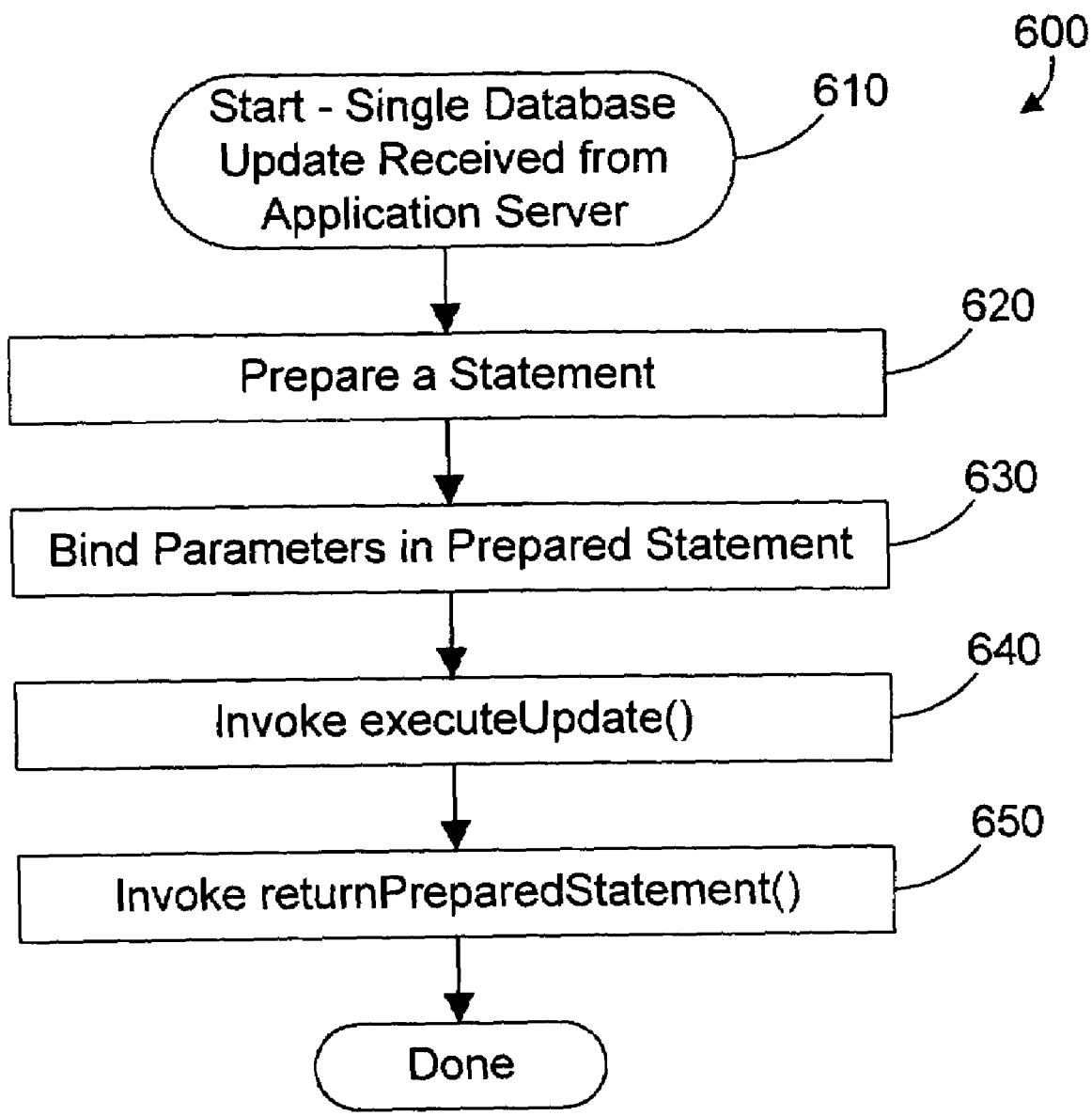
FIG. 6 is a method in accordance with the preferred embodiments for the generated code to process database updates one at a time.

Referring now to FIG. 6, a method 600 illustrates steps that are preferably performed by the generated code to request updates one at a time in step 530 of FIG. 5. Method 600 begins when the generated code receives a single database update from the application server (step 610). In response, a statement is prepared (step 620). The parameters in the prepared statement are bound (step 630). The executeUpdate() method is then invoked (step 640) to perform the update represented by the prepared statement. The returnPreparedStatement() method is then invoked (step 650). The steps in method 530 in FIG. 6 show how the generated code performs its processing of database updates one at a time. In the prior art, the executeUpdate method in step 640 and the returnPreparedStatement() in step 650 are calls to the database. The batch mechanism of the preferred embodiments intercepts the calls by the generated code to the database, thereby allowing the batch mechanism to batch the operations to the database.

Figure 7:
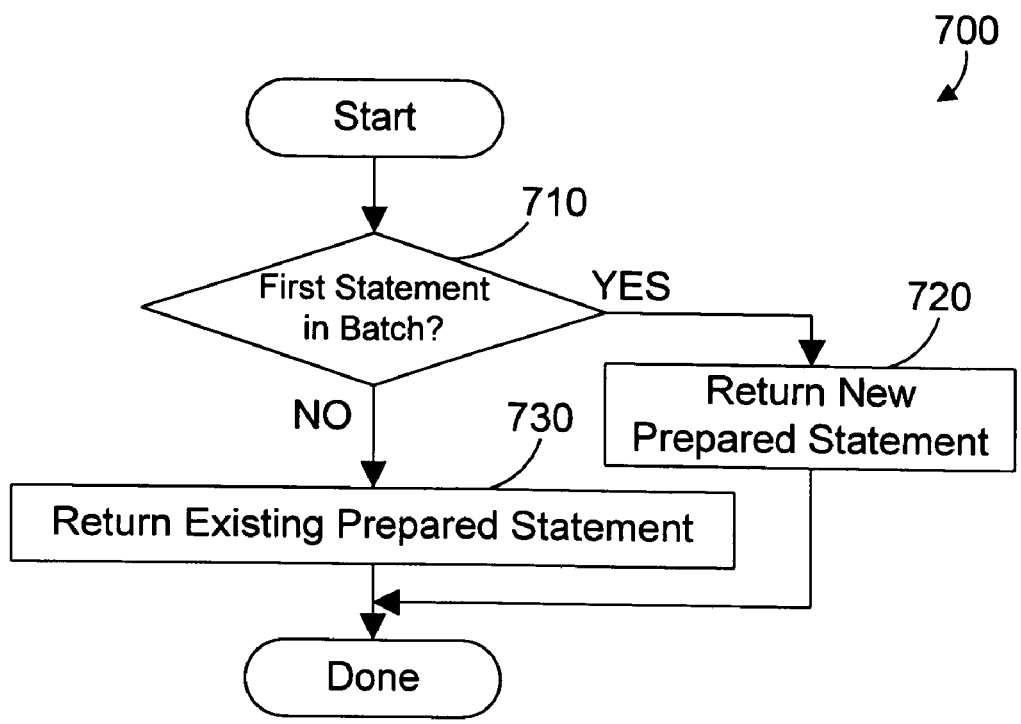
FIG. 7 is a flow diagram showing steps performed by the batch mechanism of FIG. 1 when the generated code requests a statement to be prepared in step 620 of FIG. 6.

Referring to FIG. 7, a method 700 shows the steps that are performed by the batch mechanism when the generated code requests to prepare a statement in step 620 of FIG. 6. This request is preferably made by calling a prepareStatement() method. If the statement is the first in the batch (step 710=YES), a new prepared statement is returned (step 720). If the statement is not the first in the batch (step 710=NO), an existing prepared statement is returned (step 730). Method 700 enhances system performance during processing within a batch by returning an existing prepared statement rather than preparing the statement repeatedly within the batch.

Figure 8:
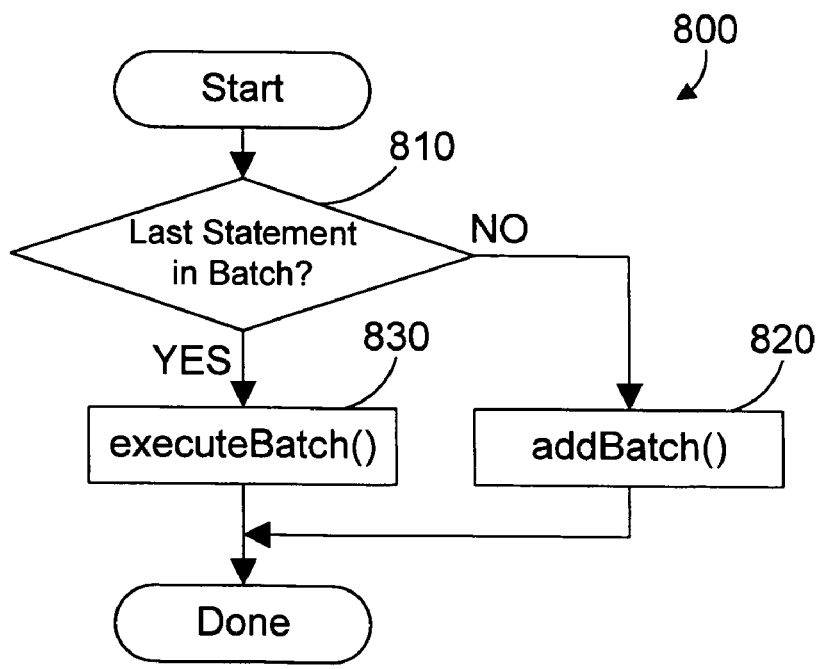
FIG. 8 is a flow diagram showing steps performed by the batch mechanism of FIG. 1 when the executeUpdate() method is invoked by the generated code in step 640 of FIG. 6.

Referring to FIG. 8, a method 800 shows the steps that are performed by the batch mechanism when the batch mechanism intercepts an executeUpdate() call from the generated code in step 640 in FIG. 6. If the statement is not the last statement in the batch (step 810=NO), the batch mechanism invokes the addBatch() method on the database (step 820). If the statement is the last statement in the batch (step 810=YES), the batch mechanism invokes the executeBatch() method on the database, which causes the database to execute all the updates in the batch in batch processing mode (step 830).

Figure 9:
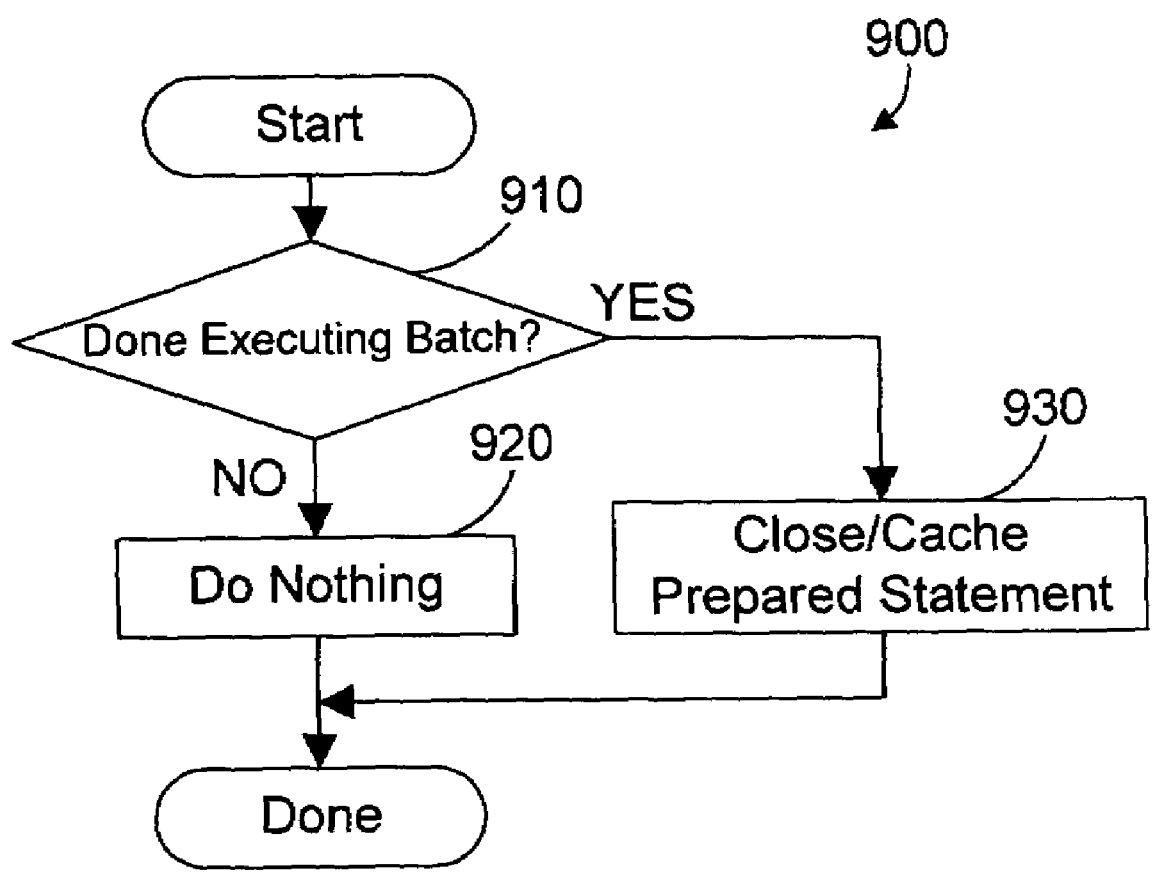
FIG. 9 is a flow diagram showing steps performed by the batch mechanism of FIG. 1 when the returnPreparedStatement() method is invoked by the generated code in step 650 of FIG. 6.

Referring to FIG. 9, a method 900 shows the steps that are performed by the batch mechanism when the batch mechanism intercepts the returnPreparedStatement() call from the generated code in step 650 of FIG. 6. If the batch mechanism is not done executing the batch (step 910=NO), method 900 does nothing (step 920). If the batch mechanism is done executing the batch (step 910=YES), the prepared statement is closed and cached for later use (step 930). Methods 800 and 900 in FIGS. 8 and 9, respectively, show how the batch mechanism 125 intercepts the executeBatch() and returnPreparedStatement() method calls from the generated code to enable batch processing of database updates.

The preferred embodiments allow batch processing in a database even when generated code does not support batch processing by intercepting calls from the generated code and batching the individual updates in the generated code into batch updates that may be processed by the database. The result is that batch processing is enabled without affecting the generated code.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a database residing in the memory, the database supporting batch updates;
   generated code residing in the memory and executed by the at least one processor, the generated code interacting with the database using a plurality of calls to the database; and
   a batch mechanism residing in the memory and executed by the at least one processor, the batch mechanism processing the plurality of calls by the generated code and batching a plurality of database updates in the plurality of calls by the generated code to the database, wherein the batch mechanism intercepts at least one call to the database from the generated code, and wherein the at least one call includes an executeUpdate() call.

2. The apparatus of claim 1 wherein the at least one call includes a call to prepare a statement.

3. The apparatus of claim 1 wherein the at least one call includes a retunPreparedStatement() call.

4. The apparatus of claim 1 wherein the batch mechanism creates a batch when a call corresponding to a first update is made by the generated code, adds an update to the batch for each subsequent call corresponding to an update that is not a last call, and executes the batch when the generated code makes the last call corresponding to a last update.

5. The apparatus of claim 1 wherein the batch mechanism batches the plurality of updates without affecting the generated code.

6. An apparatus comprising:
at least one processor;
a memory coupled to the at least one processor;
a database residing in the memory, the database supporting batch updates;
generated code residing in the memory and executed by the at least one processor, the generated code interacting with the database using a plurality of calls to the database, the plurality of calls including a plurality of calls to a prepareStatement() method, a plurality of calls to an executeUpdate() method, and a plurality of calls to a retunPreparedStatement() method; and
a batch mechanism residing in the memory and executed by the at least one processor, the batch mechanism creating a batch when an executeUpdate() call corresponding to a first update is made by the generated code, adding an update to the batch for each subsequent executeUpdate() call corresponding to an update that is not a last call, and executing the batch when the generated code makes the last executeUpdate() call corresponding to a last update.

7. The apparatus of claim 6 wherein the batch mechanism closes and caches a prepared statement corresponding to a call when the batch mechanism is done executing the batch.

8. The apparatus of claim 6 wherein the batch mechanism does not affect the generated code.

9. A computer-implemented method for enabling batch processing of database updates without affecting generated code that executes calls to a database that supports batch operations, the method comprising the steps of:
providing a batch mechanism that intercepts a plurality of calls from the generated code to the database, wherein the plurality of calls from the generated code to the database include a plurality of calls to an executeUpdate() method; and
the batch mechanism batching a plurality of database updates in the plurality of calls by the generated code to the database, and executing the batch to the database.

10. The method of claim 9 wherein the plurality of calls from the generated code intercepted by the batch mechanism include a call to prepare a statement.

11. The method of claim 9 wherein the plurality of calls from the generated code intercepted by the batch mechanism include at least one call to a returnPreparedStatement() method.

12. The method of claim 9 further comprising the steps of:
creating a batch when a call corresponding to a first update is made by the generated code;
adding an update to the batch for each subsequent call corresponding to an update that is not a last call; and
executing the batch when the generated code makes the last call corresponding to a last update.

13. A computer-implemented method for enabling batch processing of database updates without affecting generated code that executes calls to a database that supports batch operations, the method comprising the steps of:
providing a batch mechanism that intercepts the calls from the generated code to the database, the calls including a plurality of calls to a prepareStatement() method, a plurality of calls to an executeUpdate() method, and at least one call to a retunPreparedStatement() method;
creating a batch when a call corresponding to a first update is made by the generated code;
adding an update to the batch for each subsequent call corresponding to an update that is not a last call; and
executing the batch when the generated code makes the last call corresponding to a last update.

14. A computer readable program product comprising:
a batch mechanism that processes a plurality of calls by generated code that interacts with a database using a plurality of calls to the database, wherein the batch mechanism intercepts at least one call to the database from the generated code, and wherein the at least one call includes an executeUpdate() call, the batch mechanism batching a plurality of database updates in the plurality of calls by the generated code to the database; and
recordable media bearing the batch mechanism.

15. The program product of claim 14 wherein the at least one call includes a call to prepare a statement.

16. The program product of claim 14 wherein the at least one call includes a retunPreparedStatement() call.

17. The program product of claim 14 wherein the batch mechanism creates a batch when a call corresponding to a first update is made by the generated code, adds an update to the batch for each subsequent call corresponding to an update that is not a last call, and executes the batch when the generated code makes the last call corresponding to a last update.

18. The program product of claim 14 wherein the batch mechanism batches the plurality of updates without affecting the generated code.

19. A computer readable program product comprising:
a batch mechanism that creates a batch when an executeUpdate() call corresponding to a first update is made by generated code that interacts with a database using a plurality of calls to the database, the plurality of calls including a plurality of calls to a prepareStatement() method, a plurality of calls to an executeUpdate() method, and a plurality of calls to a retunPreparedStatement() method, the batch mechanism adding an update to the batch for each subsequent executeUpdate() call corresponding to an update that is not a last call, and executing the batch when the generated code makes the last executeUpdate() call corresponding to a last update; and
recordable media bearing the batch mechanism.

20. The program product of claim 19 wherein the batch mechanism closes and caches a prepared statement corresponding to a call when the batch mechanism is done executing the batch.

21. The program product of claim 19 wherein the batch mechanism does not affect the generated code.

* * * * *